United States Patent Office 2,746,133
Patented May 22, 1956

2,746,133

PROCESS OF MAKING BORON CARBIDE CONTAINING ALUMINUM, AND PRODUCTS THEREOF

Edwin C. Lowe, Niagara Falls, Ontario, Canada, assignor to Norton Company, Worcester, Mass., a corporation of Massachusetts No Drawing. Application October 16, 1951,
Serial No. 251,631

3 Claims. (Cl. 29—182.8)

The invention relates to boron carbide and provides articles of boron carbide containing aluminum.

One object of the invention is to produce a very hard material, having a hardness exceeding 9 on Mohs' scale, which also has high tensile strength for material of its class. Another object of the invention is to provide tools, gauges, and other articles which are exceedingly hard and at the same time have adequate strength. Another object of the invention is to produce a hot molded body which is strong and tough as well as hard. Another object is to provide a composition which can be synthesized from readily available materials of comparatively low cost and which composition can be molded into hard strong articles and also used for various other purposes such as an abrasive. Another object of the invention is to provide superior jet nozzles and turbine blades and many other useful articles such as impeller blades for handling grit and abrasive, sandblast nozzles, wire drawing dies, mold liners, cylinder liners, bearings and anything which should be extremely hard but which ought to be stronger than boron carbide, $B_4C$. Another object of the invention is to provide a composition which is mainly boron carbide but which is stronger than boron carbide. Another object of the invention is to provide a material which is not only extremely hard and of adequate strength but which is also quite refractory. Another object of the invention is to provide a material of the nature indicated which is non-reactive with most other materials.

Other objects will be in part obvious or in part pointed out hereinafter.

Boron carbide made in accordance with Raymond R. Ridgway's U. S. Patent No. 1,897,214 is said to be $B_4C$ but in accordance with his Patent No. 2,141,617 a homogeneous composition consisting of $xB_4C+yB$ can be made and as a matter of fact, carrying out the process of No. 1,897,214 as more specifically taught in his Patent No. 2,155,682 results in the manufacture of some material that has more boron in it than is in boron carbide which is strictly $B_4C$. In such material the excess boron is in solid solution but the boron is reactable as such. Such material has frequently been referred to as boron rich boron carbide and is high grade material which can be molded into pieces substantially as hard as pieces molded out of pure $B_4C$ provided there is not too great an excess of boron (but if there is excess of boron over $B_4C$ it will react with the graphite to pick up additional carbon during molding if there is no element present except carbon and boron).

Likewise, when manufacturing boron carbide in accordance with Patent No. 2,155,682 some material is found to contain less boron than is present in pure $B_4C$ and provided the deficiency is not too great this also is high grade material. Accordingly commercially high grade boron carbide which can be molded into pieces of close to the theoretical density and of a hardness greater than any other now known material except diamond is not restricted to literally and exactly $B_4C$ but includes material ranging all the way from $B_{3.8}C$ to $B_{5.4}C$. This material is a boride as well as a carbide and it can just as truly be called carbon boride and designated $CB_4$. It can hold either boron or carbon in solid solution which accounts for the fact that material all the way from $B_{3.8}C$ to $B_{5.4}C$ is substantially the same.

For the molding of the hardest and strongest pieces out of this material various lots are analyzed and then a batch is made up which, on the average, comes very close to $B_4C$, and of course the various components of the batch are thoroughly mixed. The best grade pieces made in this manner, molded in the furnace of Ridgway's U. S. Patent 2,125,588, have an average modulus of rupture of 40,000 pounds per square inch. Pieces thus made have a hardness greater than any other fabricated pieces of anything (since diamond cannot be fabricated) and highly polished surfaces can be formed on them and for many purposes their strength is adequate, but for many other purposes this modulus of rupture of 40,000 pounds per square inch leaves something to be desired.

I have synthesized boron carbide with aluminum having a modulus of rupture of as much as 58,000 pounds to the square inch. This material is so nearly as hard as boron carbide $B_4C$ that for many practical applications the difference is of no consequence. In fact it takes very careful testing with Knoop hardness testing apparatus to detect any difference between the hardness of my boron carbide with aluminum and Ridgway's boron carbide.

For the manufacture of my material I select high grade samples of boron carbide made in accordance with Patents 1,897,214 and 2,155,682 and I prefer to select material which, on the average, has at least as much boron as is represented by $B_4C$ and in fact I believe it is better to select material which, on the average, is close to $B_5C$. With this material I mix enough aluminum in the form of powder to yield final molded pieces having from 2% to 5% by weight of aluminum on the total of boron carbide and aluminum. I now believe that 3.5% aluminum makes the best pieces but from 2% to 5% of aluminum makes considerably stronger pieces than boron carbide pieces having no aluminum.

The actual amount of aluminum to add, however, is from 10% to 20% on the total of aluminum plus boron carbide and the reason for the apparent discrepancy will gradually appear as I proceed with the description of how to make my improved articles. After thoroughly mixing the boron carbide powder and the aluminum powder I place the resulting material in a graphite mold and place the mold in a molding furnace such as a furnace constructed according to Patent No. 2,125,588 and then mold the material in accordance with the procedure set forth in Ridgway's U. S. Patent No. 2,027,786. Standard molding pressure of 2500 pounds per square inch is preferably used, but for this first molding I can use lower pressures, as low even as 500 pounds per square inch.

The temperature of the mold should be carried to above 1800° C. and preferably to 1850° C. but not above 1900° C. The range of temperature is therefore from 1800° C. to 1900° C.

It is rather surprising that I can make this boron carbide containing aluminum in this manner since aluminum melts at 660° C. and boils at 1800° C. But I have found that attempts to synthesize this material at less than 1800° C. result in the production of too much undesired aluminum carbide, a relatively soft material having a dissociation temperature of about 1400° C.

Even when synthesizing the material at temperatures above 1800° C. some aluminum carbide is formed and in order to get rid of this unwanted material I crush the molded pieces and ball mill the fragments with water. Aluminum carbide is readily hydrolyzed and I find I can ball mill this material to obtain the final molding powder in about one seventh of the time required for ball milling an equal batch of boron carbide because the hydrolyzing of the aluminum carbide assists in breaking up the material. The resulting powder is then acid treated, washed with water and dried. This operation of ball milling with water should be carried on for about twenty to thirty hours and gets rid of practically all of the aluminum carbide and I have thereby obtained molding powder of particle size as in the following table.

TABLE I

*Satisfactory particle size of molding powder*

| Size: | Percentage by weight |
|---|---|
| 1 micron to 2 microns | 10 |
| 2 microns to 3 microns | 10 |
| 3 microns to 5 microns | 25 |
| 5 microns to 8 microns | 45 |
| 8 microns to 11 microns | 5 |
| 11 microns to 15 microns | 5 |
| | 100 |

It will now be seen why the amount of aluminum added to the boron carbide is greater than the amount of aluminum in the finished pieces. Some of the aluminum was used up in forming aluminum carbide which was eliminated by the ball milling with water. It will further be seen that the amount of aluminum to add to the boron carbide is not critical for the following reasons. After the ball milling with water the material is analyzed. Obviously it will contain from 2% to 5% of aluminum or more or less. If it contains from 2% to 5% of aluminum it is ready for final molding. If it contains more than 5% aluminum simply add enough boron carbide containing no aluminum to lower the aluminum content of the whole mixture to the desired percentage. If, after ball milling with water, the material contains less than 2% of aluminum, make up another batch adding enough more aluminum to the boron carbide than in the previous run to be certain to obtain more than 5% of aluminum. Then after ball milling with water and after analysing the second batch for aluminum, the two batches can be mixed in calculated proportions to give the desired percentage of aluminum (between 2% and 5%) in the mixture. Any such mixing should be very thoroughly done.

It is not necessary, in carrying out my invention, to use very pure aluminum. I have used commercial aluminum paint powder having the following analysis.

TABLE II

*Analysis of aluminum powder used in this invention*

| Element or compound: | Percentage by weight |
|---|---|
| Al | 86.54 |
| Fe | 0.31 |
| Si | 0.21 |
| Ti | 0.01 |
| $Al_2O_3$ (by difference) | 12.93 |
| | 100.00 |

However I have also used purer aluminum having the following analysis.

TABLE III

*Analysis of aluminum powder used in this invention*

| Element or compound: | Percentage by weight |
|---|---|
| Al | 98.70 |
| Fe | 0.10 |
| Si | 0.14 |
| Ti | 0.00 |
| $Al_2O_3$ | 0.02 |
| | 98.96 |

Thus a considerable amount of alumina can be tolerated but other impurities should be kept to a low figure. Probably 15% of alumina in the added powder is a practical maximum with not more than 1% of matter other than Al and $Al_2O_3$. Some of the alumina is undoubtedly reduced to aluminum during the two molding stages but X-ray analysis shows that some alumina appears in the final pieces where powders such as those analyzed in Table II are used. Alumina in the final pieces up to 2% by weight can be tolerated. Other elements and compounds other than aluminum, boron and boron carbide can be tolerated up to 1% by weight. The aluminum which is present from 2% to 5% is other than that in $Al_2O_3$.

There are two borides of aluminum recognized in the literature, namely aluminum boride $AlB_2$ and aluminum boride $AlB_{12}$. I cannot say whether either or both of these is formed in making pieces according to my invention or if so in what proportion. Examination of polished samples of my aluminum-carbon boride composition showed the presence of two phases other than boron carbide, i. e. three phases in all. These two other phases seemed to be quite transparent and hence it is likely that one was $AlB_2$ and the other was $AlB_{12}$. Accordingly I will have to say that my composition contains from 2% to 5% by weight of aluminum additional to the aluminum in alumina $Al_2O_3$.

After the molding powder containing 2% to 5% by weight of aluminum apart from any alumina, having not over 2% of alumina and not over 1% of matter apart from the boron carbide (which can be anywhere from $B_{3.8}C$ to $B_{5.3}C$) alumina and other aluminum matter has been thus prepared, it is charged into a graphite mold (see U. S. Patents Nos. 2,027,786; 2,121,744; 2,125,588; 2,150,884; 2,522,046; 2,535,180 and 2,473,476 for various mold shapes which can be used although the invention is not limited to the use of any shape of mold), the mold is then charged into a pressure furnace such as the one illustrated in Ridgway's Patent No. 2,125,588, and then the furnace tube is heated and the pressure is applied, the temperature being run up to between 1850° C. and 2325° C. but preferably between about 1900° C. and 1950° C. and at the top temperature I prefer to use standard pressure of 2500 pounds per square inch and anyway the pressure should rise to at least 1500 pounds per square inch. It is desirable to hold the pressure until the furnace tube temperature has dropped to 1600° C. as otherwise, in some cases, the article or articles may crack.

Articles made in accordance with this invention having percentage of aluminum as defined herein according to the following table have had average modulus of rupture according to the table. They are superior articles if they have a modulus of rupture of at least 43,000 pounds to the square inch.

TABLE IV

| Percentage of Aluminum by Weight | Average Modulus of Rupture Pounds per Square Inch |
|---|---|
| 3.5 | 58,000 |
| 3.0 | 54,000 |
| 4.0 | 47,000 |

While I prefer to make the composition in a molding furnace as described nevertheless the composition can be made in a resistance furnace such as the furnace illustrated in Patent No. 2,123,158. Control of the process is a little more difficult in this furnace of Patent No. 2,123,158 than it is in the tube furnace of Patent No. 2,125,588 as when synthesizing the material in a graphite mold conditions are under almost complete control. In either of these furnaces the conditions are of course reducing. The advantage, however, of using a furnace such as that shown in Patent No. 2,123,158 is that larger yields can be obtained. For obtaining still larger yields an arc furnace such as shown in Ridgway's Patent No. 2,285,837 could be used but here again it will be found that conditions are still more difficult to control in such a furnace.

It will thus be seen that there has been provided by this invention a composition and articles of boron carbide containing aluminum and a process for making the same in which the various objects hereinabove set forth together with many thoroughly practical advantages are successfully achieved. As various possible embodiments might be made of the mechanical features of the above invention and as many changes might be made in the embodiments above set forth, it is to be understood that all matter hereinbefore set forth is to be interpreted as illustrative and not in a limiting sense.

I claim:

1. A composition of matter essentially consisting of boron carbide having from 2% to 5% of aluminum additional to the aluminum in alumina, said composition having not over 2% of alumina and not over 1% of matter apart from boron carbide, alumina and the said 2% to 5% of aluminum additional to the aluminum in alumina, said boron carbide having been reacted with said aluminum and said aluminum being completely dispersed throughout said boron carbide.

2. An article of manufacture essentially consisting of boron carbide having from 2% to 5% of aluminum additional to the aluminum in alumina, said article having not over 2% of alumina and not over 1% of matter apart from boron carbide, alumina and the said 2% to 5% of aluminum additional to the aluminum in alumina, said boron carbide having been reacted with said aluminum and said aluminum being completely dispersed throughout said boron carbide, said article being compacted to a dense hard mass having a hardness greater than 9 on Mohs' scale and a modulus of rupture of at least 43,000 pounds per square inch.

3. Process of making boron carbide containing aluminum which comprises adding to boron carbide which analyses between $B_{3.8}C$ and $B_{5.4}C$, aluminum in powder form containing not over 15% of alumina and not more than 1% of matter other than aluminum and alumina, mixing, placing the mixture of boron carbide and aluminum in a graphite mold, and heating to a temperature of between 1800° C. and 1900° C. while maintaining a pressure on the mold of at least 500 pounds per square inch, thereby producing a solid piece of the material, then crushing the piece and ball milling the fragments with water to powder of a particle size of at least as small as 15 microns, thereby also eliminating aluminum carbide from the material, then making a batch of powder containing from 2% to 5% by weight of aluminum additional to the aluminum in alumina, the remainder boron carbide and not over 2% of alumina and said batch containing not over 1% of matter apart from boron carbide, alumina, and said 2% to 5% by weight of aluminum additional to the aluminum in alumina, by mixing boron carbide powder containing more than the required amount of aluminum within said range of 2% to 5% made as aforesaid with boron carbide powder containing less than said required amount of aluminum, charging said batch into a graphite mold, and then heating said batch in said mold to between 1850° C. and 2325° C. under a pressure of at least 1500 pounds per square inch.

References Cited in the file of this patent

UNITED STATES PATENTS

| | | |
|---|---|---|
| 270,384 | Call | Jan. 9, 1883 |
| 2,077,345 | Van der Pyl | Apr. 13, 1937 |
| 2,077,366 | Milligan | Apr. 13, 1937 |
| 2,200,258 | Boyer | May 14, 1940 |